United States Patent
Sasaki

(10) Patent No.: US 7,808,543 B2
(45) Date of Patent: Oct. 5, 2010

(54) AUTOMATIC FOCUSING SYSTEM

(75) Inventor: Tadashi Sasaki, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 476 days.

(21) Appl. No.: 11/953,183

(22) Filed: Dec. 10, 2007

(65) Prior Publication Data
US 2008/0136959 A1   Jun. 12, 2008

(30) Foreign Application Priority Data
Dec. 11, 2006   (JP) .......................... P2006-333432

(51) Int. Cl.
H04N 5/232 (2006.01)
H04N 5/228 (2006.01)
G03B 17/00 (2006.01)
(52) U.S. Cl. ...................... 348/345; 348/222.1; 396/79
(58) Field of Classification Search ............. 348/222.1, 348/296, 345, 349, 350, 362
See application file for complete search history.

(56) References Cited

U.S. PATENT DOCUMENTS 5,574,535 A * 11/1996 Ogasawara .................. 396/95

| 5,664,236 | A  | * | 9/1997 | Utagawa | ....................... 396/96 |
| 7,423,686 | B2 | * | 9/2008 | Yamashita | .................... 348/348 |
| 7,515,820 | B2 | * | 4/2009 | Nakai et al. | .................. 396/125 |
| 7,702,230 | B2 | * | 4/2010 | Kijima | ........................ 396/114 |
| 2004/0010652 | A1 | | 1/2004 | Adams et al. | |
| 2004/0130652 | A1 | | 7/2004 | Sasaki et al. | |

FOREIGN PATENT DOCUMENTS

JP   2004-212458 A   7/2004

* cited by examiner

Primary Examiner—Lin Ye
Assistant Examiner—Trung Diep
(74) Attorney, Agent, or Firm—Birch, Stewart, Kolasch & Birch, LLP

(57) ABSTRACT

To provide an automatic focusing system which has an AF pickup device dedicated to an AF operation and which can perform the AF operation with high following ability to a moving subject. At the time of performing an AF control operation, a CPU of a lens unit sets a focusing state of a photographing optical system to an in-focus state by controlling a focus lens group FL of the photographing optical system so that an estimated focus value representing the magnitude of a contrast of a subject image is the maximum. The CPU adjusts an electronic shutter speed of the AF pickup device based on a brightness level of an image signal acquired by the AF pickup device and enhances the frame rate of the AF pickup device as high as possible.

6 Claims, 7 Drawing Sheets

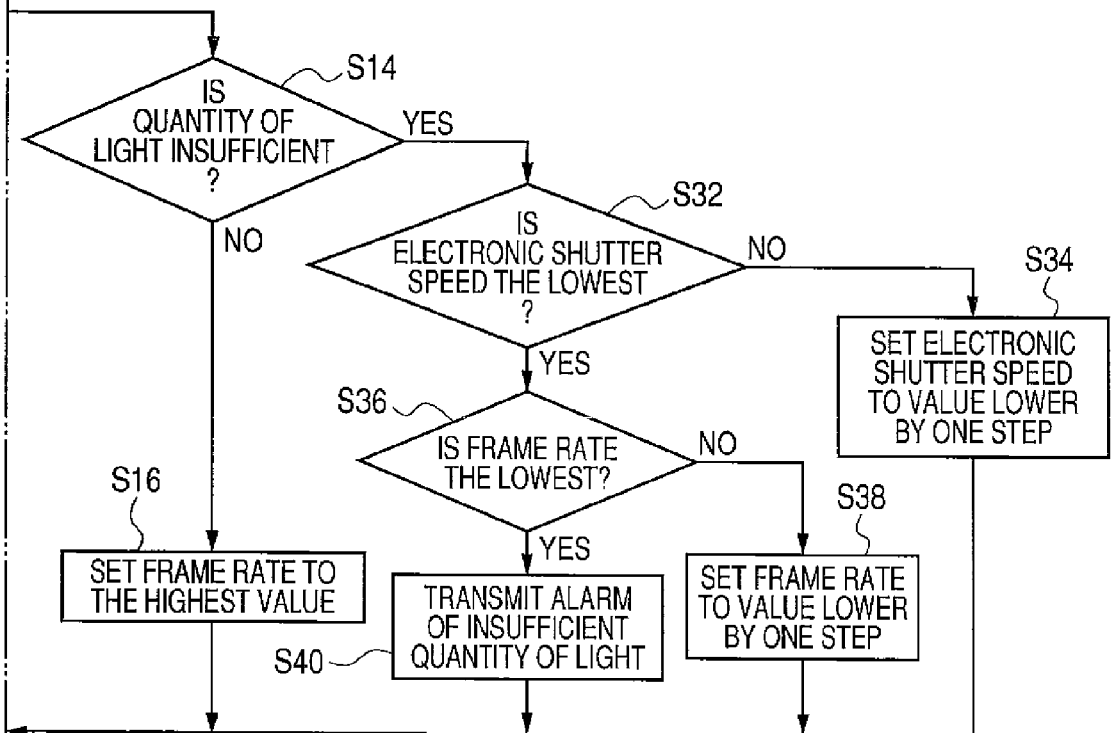

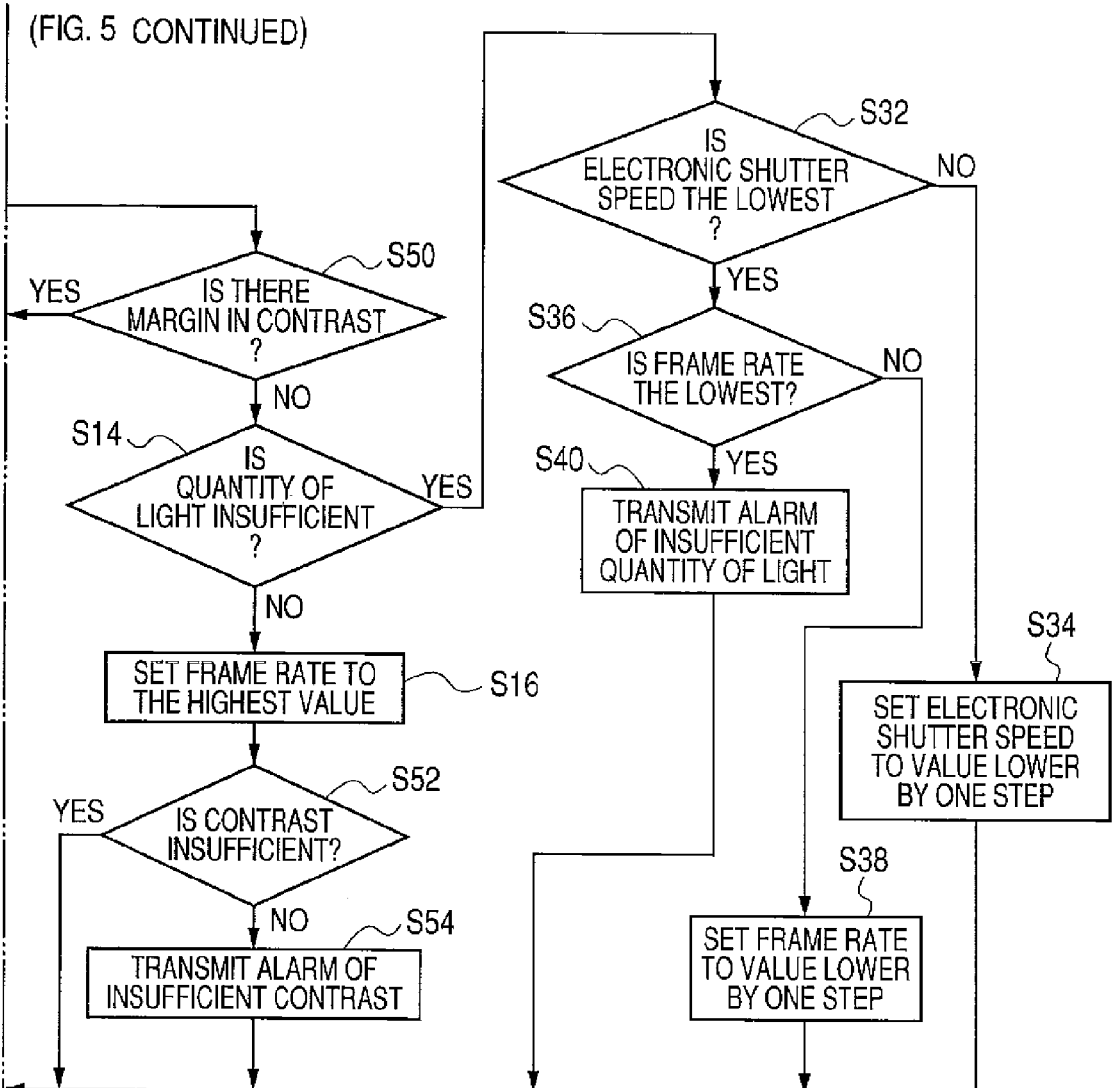

AUTOMATIC FOCUSING SYSTEM

CROSS-REFERENCE TO RELATED APPLICATIONS

This application is based on and claims priority under 35 USC 119 from Japanese Patent Application No. 2006-333432 filed Dec. 11, 2006.

BACKGROUND

1. Technical Field

The present invention relates to an automatic focusing system, and more particularly, to an automatic focusing system that includes an image pickup device dedicated to an automatic focusing (AF) operation and that automatically adjusts the focus of a photographing optical system by the use of a contrast of a subject image input by the image pickup device.

2. Related Art

In an automatic focusing function employed in video cameras such as television cameras, a contrast method is generally used in which the contrast of a subject image is detected from a video signal obtained by an image pickup device and the focus is controlled to be the largest (maximum). The contrast of the subject image is quantitatively detected by extracting high-frequency components from a video signal (brightness signal) obtained by the image pickup device and adding the signals of the high-frequency components in the unit of field. The added value represents the magnitude of the contrast of the subject image and also represents a degree of focusing. The added value is referred to as an estimated focus value in this specification.

It has been suggested that an AF-dedicated image pickup device (hereinafter, referred to as AF pickup device) for taking an AF subject image is provided independently of an image pickup device (hereinafter, referred to as video pickup device) for taking an original image as a video camera itself. For example, beam splitting means such as a half mirror is disposed in a photographing optical system that forms a subject image on the video pickup device and the subject beam input to the photographing optical system is branched into two optical paths. The subject beam branched into one optical path (video optical path) is incident on the video pickup device to form a subject image on the pickup face of the video pickup device. The AF pickup device is disposed in the other optical path (AF optical path) and the subject beam branched into the AF optical path is incident on the AF pickup device to form a subject image on the pickup face of the AF pickup device. The optical system disposed in the AF optical path is configured so that the subject image formed by the AF pickup device is equal to the subject image formed by the video pickup device. The focus of the optical system for the video pickup device is properly adjusted by adjusting the focus of the photographing optical system so that the contrast of the subject image obtained by the AF pickup device is the highest.

The exposure dose adjustment (Quantity of light adjustment) for the AF pickup device is performed by a mechanical iris diaphragm and an electronic shutter function used in common in the quantity of light adjustment of the video pickup device. The mechanical iris diaphragm adjusts the quantity of light adjustment of the video pickup device to be appropriate, but the electronic shutter adjusts the quantity of light independently of the video pickup device so that the exposure dose of the AF pickup device is appropriate.

The subject image (video) acquired by the AU pickup device is not used as a recording or reproducing image like the subject image (video) acquired by the video pickup device. Accordingly, it is possible to freely set a frame rate (image input period) at the time of allowing the AF pickup device to input the subject image (video). On the other hand, when the frame rate of the AF pickup device is set to be high (when the image input period is set to be low), it is possible to reduce the detection period of the contrast of the subject image, that is, the detection period of the estimated focus value. When the detection period of the estimated focus value is reduced, the automatic focusing operation having excellent subject following ability can be performed. Therefore, it is preferable that the frame rate of the AF pickup device is set to be as high as possible.

JP-A-2004-212458 (Corresponding to US 2004-0130652) Patent Document 1 discloses that the input of the AF subject image when a shutter button at the time of photographing a still image is halfway pushed is performed at a frame rate higher than the input of the video-photographing subject image when the shutter button is fully pushed.

However, Patent Document 1 does not disclose a change in frame rate at the time of continuously performing the input of the AF subject image and an improvement in AF following ability for a moving subject.

The electronic shutter speed (exposure time) varies depending on the brightness of a subject or the like and the frame rate of the AF pickup device cannot be set to be higher than the electronic shutter speed. Accordingly, since the frame rate of the AF pickup device cannot be kept to set to a high constant speed, the frame rate need be set in consideration of a case where the electronic shutter speed is low. Therefore, it is not possible to simply enhance the frame rate of the AF pickup device.

The invention is contrived in consideration of the above-mentioned situations. An object of the invention is to provide an automatic focusing system which has an AF pickup device dedicated to an AF operation and which can perform the AF operation with high following ability to a moving subject.

SUMMARY

[1] According to an aspect of the invention, an automatic focusing system includes a photographing optical system, a video pickup device, an AF pickup device, an automatic focusing section, an exposure time adjusting section and an image input period changing section. The photographing optical system forms a subject image. The video pickup device is allowed to input the subject image, which is formed by the photographing optical system, as a recording or reproducing subject image. The AF pickup device is an image pickup device for sequentially inputting the subject image as subject information used in an automatic focusing operation of automatically setting a focusing state of the photographing optical system for the video pickup device to an in-focus state. The AF pickup device is different from the video pickup device. The automatic focusing section automatically adjusts the focus of the photographing optical system so that the focusing state of the photographing optical system is changed to the in-focus state based on the subject image received by the AF image pickup device. The exposure time adjusting section adjusts an exposure time for allowing the AF image pickup device to take the subject image of respective comas so as to be an appropriate exposure dose. The image input period changing section changes an image input period at the time of allowing the AF pickup device to sequentially and periodically input the subject image of the respective comas within a range not shorter than the exposure time, in accordance with the exposure time adjusted by the exposure time adjusting section.

According to [1], since the image input period at the time of allowing the AF pickup device to sequentially input the subject image as the subject information is made to vary depending on the exposure time, it is possible to properly reduce the image input period within a range not shorter than the exposure time. Accordingly, it is possible to enhance the frame rate of the AF pickup device as long as the electronic shutter speed is not limited, thereby improving the AF following ability to a moving subject.

[2] According to the automatic focusing system of [1], the automatic focusing section may includes contrast detecting section that detects a contrast of the subject image input by the AF pickup device and automatically may adjusts the focus of the photographing optical system based on the contrast of the subject image detected by the contrast detecting section so that the focusing state of the photographing optical system is changed to the in-focus state.

According to [2], the automatic focusing system provides the aspect employing a contrast method as the automatic focusing method and the aspect including a section that detects the contrast of the subject image acquired by the AF pickup device.

[3] According to the automatic focusing system of [2], the exposure time adjusting section may performs a process of reducing the exposure time when a value representing the magnitude of the contrast of the subject image detected by the contrast detecting section is not less than a predetermined value even if the exposure dose appropriates.

According to [3], it is possible to reduce the exposure dose when the exposure dose of the AF pickup device is appropriate and the detected contrast of the subject image is sufficiently high. Accordingly, it is possible to further enhance the AF following ability by further reducing the exposure time.

[4] According to the automatic focusing system of [1], the automatic focusing system may include an image input period setting section and a selection section. The image input period setting section may set the image input period of the AF pickup device to a desired value. The selection section may select one of the image input period setting section and the image input period changing section to set the image input period of the AF pickup device.

According to [4], it is possible to switch the aspect according to [1] in which the image input period is changed depending on the exposure time and the aspect in which the image input period is set (fixed) to a desired value regardless of the exposure time.

[5] According to the automatic focusing system of [2], the automatic focusing system may include an image input period setting section and a selection section. The image input period setting section may set the image input period of the AF pickup device to a desired value. The selection section may select one of the image input period setting section and the image input period changing section to set the image input period of the AF pickup device.

According to [5], it is possible to switch the aspect according to [2] in which the image input period is changed depending on the exposure time and the aspect in which the image input period is set (fixed) to a desired value regardless of the exposure time.

[6] According to the automatic focusing system of [3], the automatic focusing system may include an image input period setting section and a selection section. The image input period setting section may set the image input period of the AF pickup device to a desired value. The selection section may select one of the image input period setting section and the image input period changing section to set the image input period of the AF pickup device.

According to [6], it is possible to switch the aspect according to [3] in which the image input period is changed depending on the exposure time and the aspect in which the image input period is set (fixed) to a desired value regardless of the exposure time.

With the automatic focusing system according to the invention, it is possible to perform an AF operation with excellent following ability to a moving subject in the automatic focusing system having the AF pickup device dedicated to the AF operation.

DETAILED DESCRIPTION

Hereinafter, the best mode for carrying out an automatic focusing system according to an embodiment of the invention will be described in detail with reference to the accompanying drawings.

Figure 1:
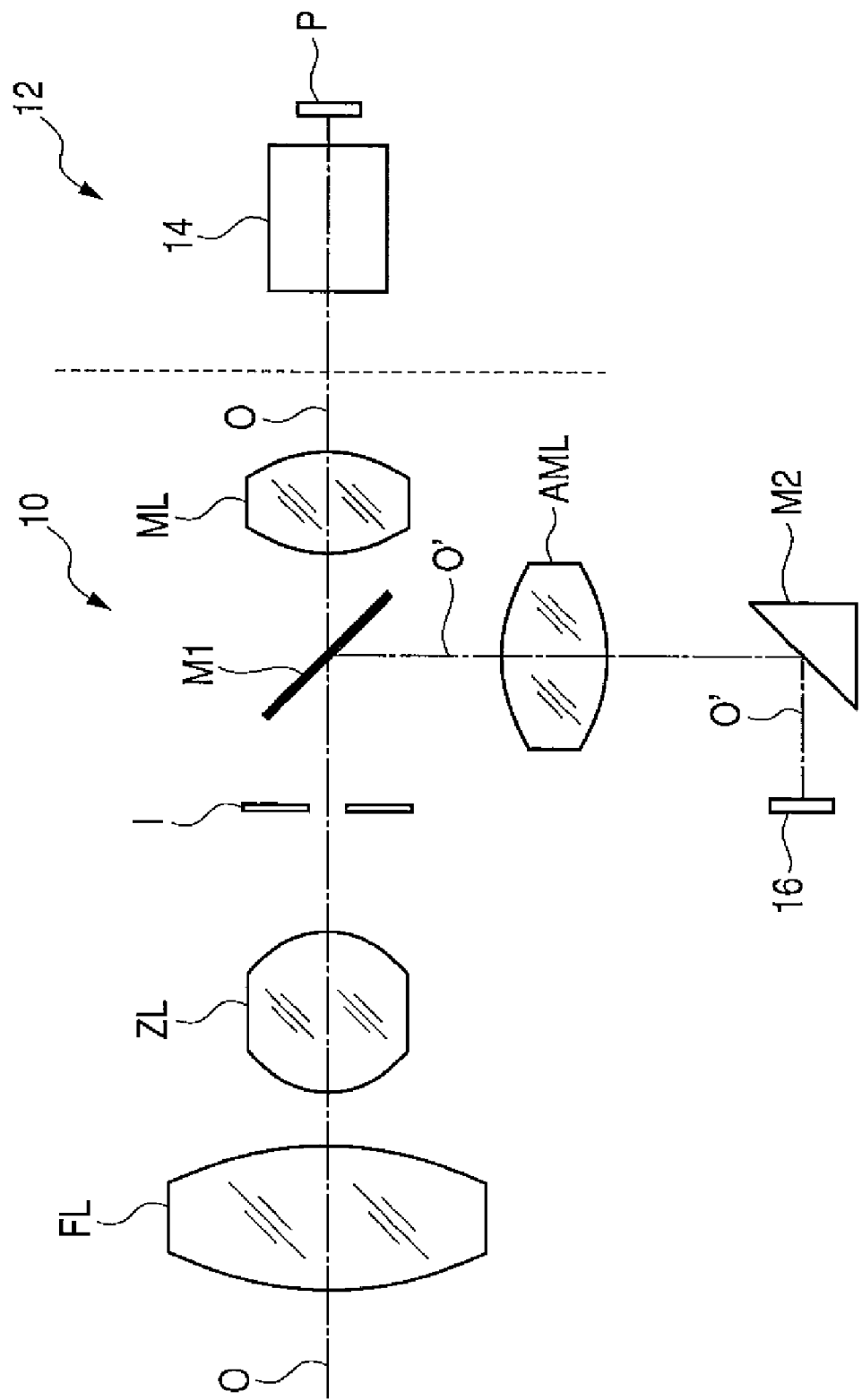
FIG. 1 is a diagram illustrating a configuration of an optical system of an automatic focusing system according to an embodiment of the invention.

FIG. 1 is a diagram illustrating an optical system in an automatic focusing system according to an embodiment of the invention. In the figure, optical systems of a camera (camera body) 12 for television broadcasting and a lens unit 10 fitted to the camera 12 are shown. In the optical system (photographing lens) of the lens unit 10, a focus lens group FL, a zoom lens group ZL, an iris diaphragm I, a master lens group ML, and the like are disposed from the front end along an optical axis O of a main optical path. The focus lens group FL and the zoom lens group are movable forward and backward along the optical axis O, the adjustment of a focus (adjustment of a photographing distance (subject distance)) is performed by adjusting the position of the focus lens group FL, and the adjustment of a zoom (adjustment of a focal length) by adjusting the position of the zoom lens group ZL. By adjusting an aperture of the iris diaphragm I, the adjustment of quantity of light is performed. A subject beam being incident on a photographing lens and passing through these lens groups is incident on the optical system of the camera 12.

A tricolor separation optical system 14 simply shown is disposed in the optical system of the camera 12, the subject beams is separated into beams of R (red), G (green), and B (blue) wavelengths by the tricolor separation optical system 14 and the separated beams are incident on the pickup faces of the image pickup devices (solid-state image pickup devices such as CCD) of R, G, and B. The image pickup devices of R, G, and B are represented by one image pickup device P as shown in the figure. The subject image taken by the image pickup device P disposed in the camera 12 is shaped into a recording or reproducing image signal by a predetermined signal processing circuit in the camera 12. The image pickup device disposed in the camera 12 is called a video pickup device.

In the optical system of the lens unit 10, a half mirror M1 (beam splitter) at an angle tilted by about 45° about the optical axis O is disposed between the iris diaphragm I and the master lens group ML. Accordingly, the subject beam incident on the half mirror M1 through the focus lens group FL, the zoom lens group ZL, and the iris diaphragm I is separated into a subject beam passing through the half mirror M1 and a subject beam reflected by the half mirror M1.

The subject beam passing through the half mirror M1 is guided to the camera along the optical axis O of the main optical path as described above to form a subject image on the pickup face of the video pickup device P.

On the other hand, the subject beam reflected by the half mirror M1 is guided as an AF subject beam to the AF optical path of an optical axis O' substantially perpendicular to the optical axis O. An AF master lens group AML, a prism M2, and an AF pickup device 16 are disposed in the AF optical path.

The AF subject beam reflected by the half mirror M1 and branched to the AF optical path from the main optical path passes through the AF master lens group AML having an image forming function similarly to the master lens group ML, is reflected by the prism M2 at a right angle, and then forms a subject image on the pickup face of the AF pickup device 16 for acquiring an AF image signal.

The AF pickup device 16 is an image pickup device (solid-state image pickup device such as CCD) dedicated to the AF operation and serves to convert the subject image formed on the pickup face by the AF subject beam into electrical signals and to output the AF image signals. The pickup face of the AF pickup device 16 is disposed with a distance optically equivalent to the pickup face of the video pickup device P of the camera 12 and allows a subject image (a subject image of which a subject in focus is the same) substantially equivalent to the subject image taken by the video pickup device P to be taken by the AF pickup device 16.

Figure 2:
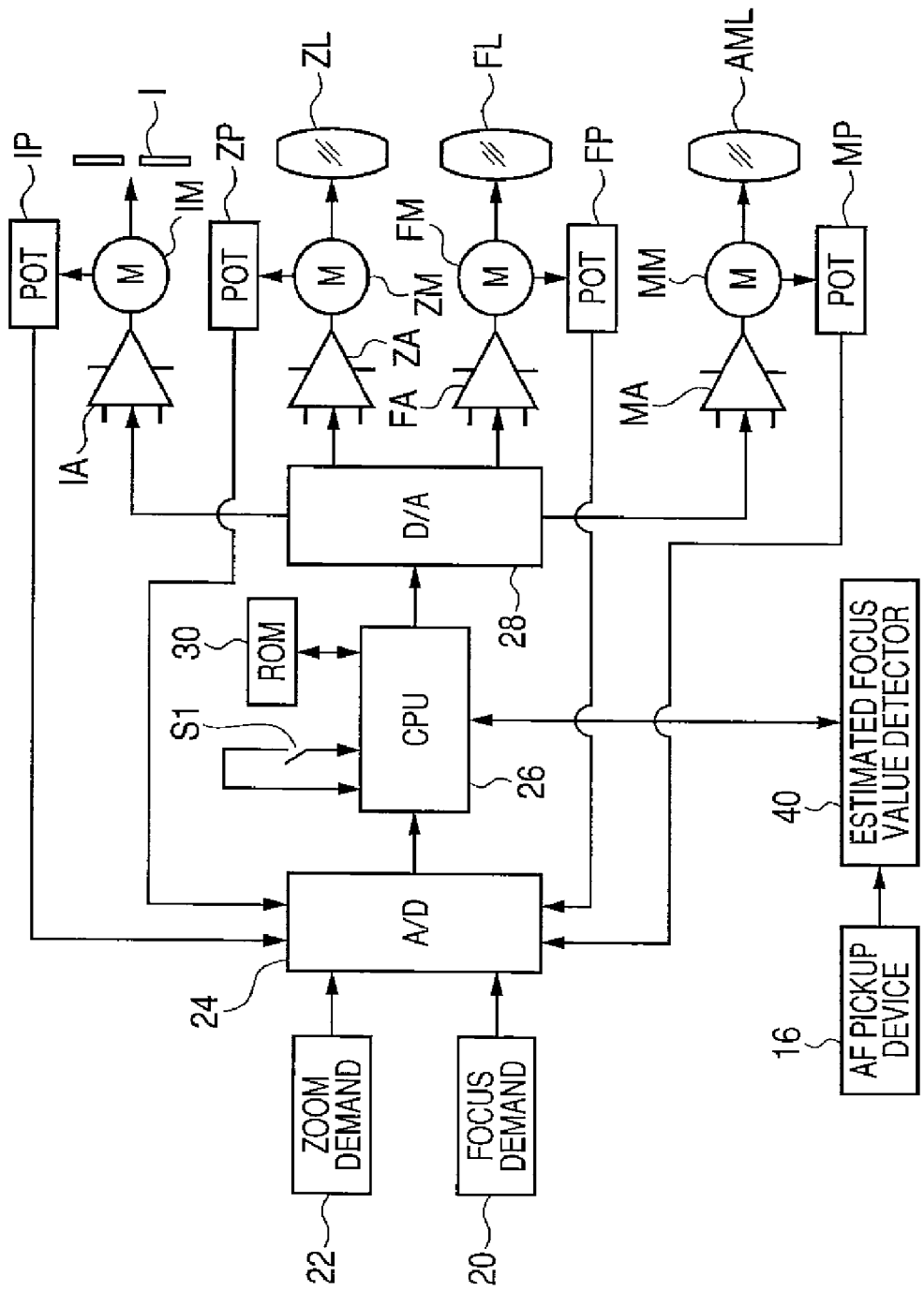
FIG. 2 is a block diagram illustrating a configuration of a controller that controls an optical system of a lens unit shown in FIG. 1 and that constructs the automatic focusing system according to the embodiment of the invention.

FIG. 2 is a block diagram illustrating a configuration of a controller that controls the optical system of the lens unit 10 and that constructs the automatic focusing system according to an embodiment of the invention. In the figure, the focus lens group FL, the zoom lens group ZL, the iris diaphragm I, and the AF master lens group AML shown in FIG. 1 are illustrated and are driven by a focus motor FM, a zoom motor ZM, an iris diaphragm motor IM, and an AF master motor MM, respectively. The motors FM, ZM, IM, and MM are activated by a focus amplifier FA, a zoom amplifier ZA, an iris diaphragm amplifier IA, and an AF master amplifier MA, respectively, in accordance with driving signals transmitted through a D/A converter 28 from the CPU 26.

Potentiometers FP, ZP, IP, and MP for detecting rotational positions of the motors FM, ZM, IM, and MM are disposed in the motors, respectively, and output signals of the potentiometers FP, ZP, IP, and MP are sent to the CPU 26 through an A/D converter 24. The CPU 26 can acquire information on current positions of the focus lens group FL, the zoom lens group ZL, the iris diaphragm I, and the AF master lens group AML by the use of the output signals of the potentiometers FP, ZP, IP, and MP.

In the system shown in the figure, a focus demand 20 and a zoom demand 22 are connected as a controller. An operation member to be manually operated by an operator is disposed in the focus demand 20 and the zoom demand 22. A command signal indicating a target position or a target speed of the focus lens group FL or the zoom lens group ZL is sent to the CPU 26 through the A/D converter 24 from the focus demand 20 or the zoom demand 22 on the basis of the operation of the operation members.

The control of the focus lens group FL (focus control) is switched between the control of a manual focusing MF and the control of an automatic focusing (AF) by the operation of an AF switch S1 disposed at a predetermined position (such as in the main body of the lens unit 10 or the focus demand 20). A signal indicating an ON/OFF state of the AF switch S1 is sent to the CPU 26. The CPU 26 switches the controls of MF and AF on the basis of the ON/OFF state of the AF switch S1, as described later.

At the time of the MF control, the CPU 26 controls the focus lens group FL on the basis of the command signal given from the focus demand 20. For example, the CPU 26 outputs a driving signal for driving the focus motor FM to the focus amplifier FA so as to reach the target position or the target speed indicated by the command signal given from the focus demand 20.

On the other hand, at the time of the AF control, the CPU 26 controls the focus lens group FL on the basis of estimated focus value information given from an estimated focus value detector 40 as described in detail later.

The control of the zoom lens group ZL (zoom control) is performed on the basis of the command signal given from the zoom demand 22. The CPU 26 outputs a driving signal for driving the zoom motor ZM to the zoom amplifier ZA so as to reach a target position or a target speed indicated by the command signal given from the zoom demand 22.

The control of the iris diaphragm I (iris control) is performed on the basis of the command signal given from the camera 12 shown in FIG. 1. The CPU 26 outputs a driving signal for driving the iris diaphragm motor IM to the iris diaphragm amplifier IA so as to reach a set position (iris value) indicated by the command signal.

The AF master lens group AML is controlled by the CPU 26 at the time of the AF control. The CPU 26 outputs a driving signal for driving the AF master motor MM to the AF master amplifier MA to allow the AF master lens group AML to perform, for example, a wobbling operation. The wobbling operation of the AF master lens group AML provides the same advantage as minutely varying the focus of the photographing lens to the proximal end and the infinite end, by minutely moving the AF master lens group AML along the optical axis O' forwardly and backwardly. The wobbling operation is performed to detect a focusing direction or to determine whether it is in an in-focus state, at the time of the AF control.

The estimated focus value detector 40 shown in FIG. 2 is a processor for detecting the magnitude of a contrast of a subject image, that is, an estimated focus value for estimating the focusing degree, on the basis of the image signal (brightness signal) acquired from the AF pickup device 16 shown in FIG. 1. At the time of the AF control, the CPU 26 sets the photographing lens to an in-focus state by controlling the focus lens group FL so that the estimated focus value acquired by the estimated focus value detector 40 is the largest (the maximum).

Subsequently, the processes of the CPU 26 or the like at the time of the AF control will be described in detail.

Figure 3:
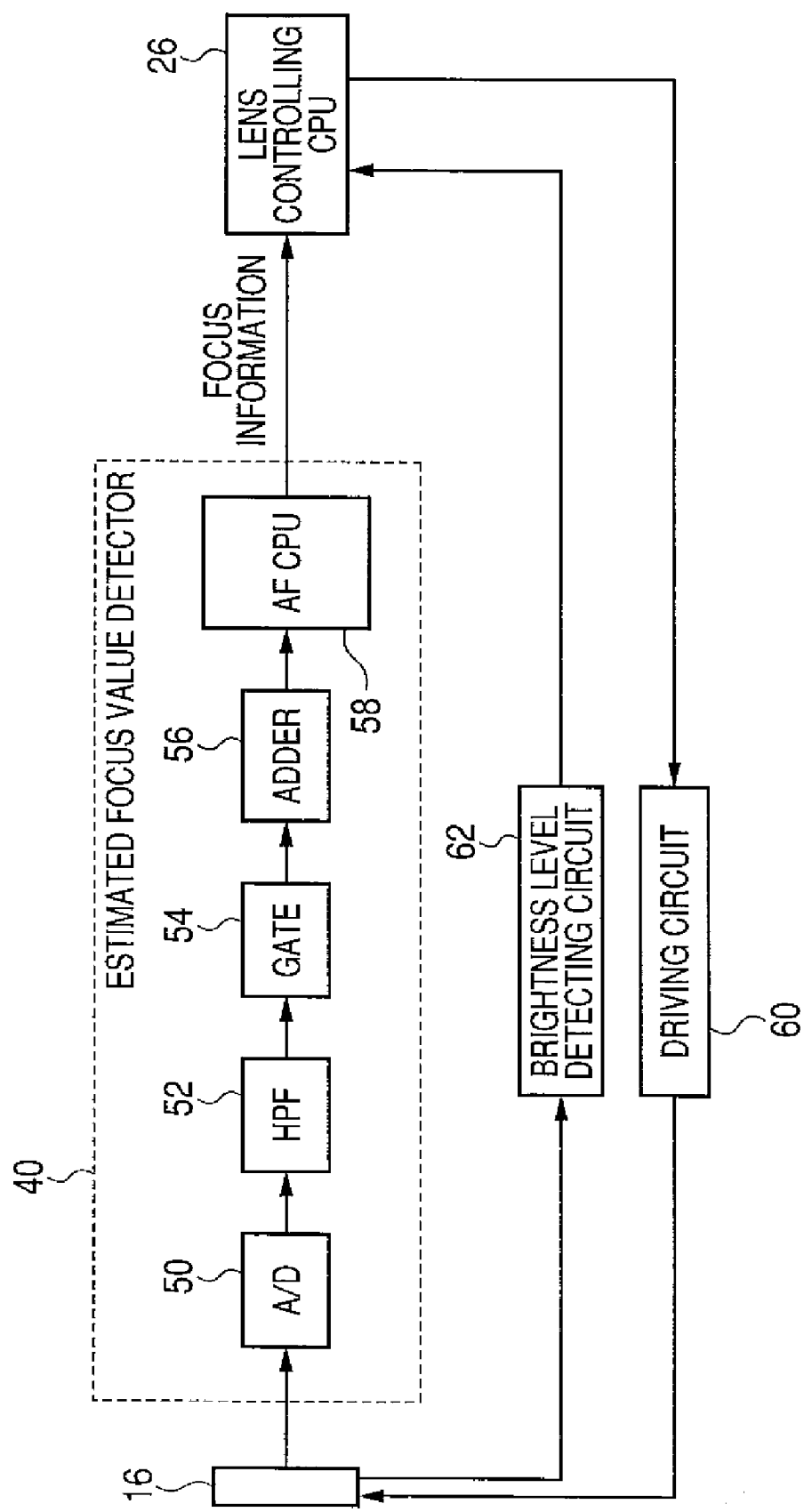
FIG. 3 is a diagram illustrating a configuration for performing an estimated focus value detecting process.

FIG. 3 is a diagram illustrating a configuration for performing an estimated focus value detecting process. As shown in the figure, the estimated focus value detector 40 includes an A/D converter 50, a high-pass filter (HPF) 52, a gate circuit 54, an adding circuit 56, and a CPU (AF CPU) 58. The CPU 58 is referred to as an AF CPU 58 for the purpose of distinguishing it from the CPU 26. The AF pickup device 16 is an image pickup device for taking a black and white subject image. An image signal (brightness signal) representing a black and white subject image taken by the AF pickup device 16 is input to the estimated focus value detector 40.

The image signal input to the estimated focus value detector 40 is first input to the A/D converter 50 and is converted into a digital signal by the A/D converter 50. The digitalized image signal is subsequently input to the HPF 52 and only a high-frequency component of the image signal is extracted.

The image signal with the high-frequency component output from the HPF 52 is input to the gate circuit 54. Only a signal within a predetermined AF area (for example, a rectangular area at the center of a screen) set in a photographing range (screen) is extracted from the image signal input to the gate circuit 54. The image signal in the AF area is input to the adding circuit 56. The adding circuit 56 adds the input image signal in the unit of one coma (one frame). The added value is output from the adding circuit 56. The added value output from the adding circuit 56 is read as an estimated focus value indicating the magnitude of the contrast of the subject image in the AF area every frame by the CPU 58. The AF CPU 58 of the estimated focus value detector 40 can transmit and receive various data to and from the CPU 26 of FIG. 2 controlling the entire lens unit and thus transmits the acquired estimated focus value to the CPU 26 in response to a request from the CPU 26. The method of detecting an estimated focus value from an image signal is widely known and methods other than this embodiment may be used.

The CPU 26 performs the AF control by the use of the following process. At the time of the AF control, the CPU 26 wobbles the AF master lens group AML and reads the estimated focus value from the estimated focus value detector 40 at each position during the wobbling operation. The CPU 26 determines whether it is in the in-focus state on the basis of the estimated focus value at each position read at the time of performing the wobbling operation. The determination whether it is in the in-focus state can be performed by determining whether the estimated focus value at each position reaches a value which can be considered as a substantially constant value greater than a predetermined value, and the like. When determining that it is not in the in-focus state, the CPU 26 detects a focusing direction (in-focus direction) and moves the focus lens group FL in the detected focusing direction at a predetermined speed or by a predetermined amount, on the basis of the estimated value at each position read at the time of performing the wobbling operation. When it is determined that it is in the in-focus state, the movement of the focus lens group FL is stopped. By repeating the above-mentioned processes, the AF control process is performed while the AF switch S1 is in the ON state, and the focus of the photographing lens is automatically adjusted so that the focusing state of the photographing lens becomes the in-focus state.

Subsequently, a quantity of light adjustment (exposure adjustment) process of the AF pickup device 16 will be described. In FIG. 3, a driving circuit 60 for driving the AF pickup device 16 and a brightness level detecting circuit 62 are provided. The driving circuit 60 supplies various driving pulses such as vertical transfer pulses, horizontal transfer pulses, and charge sweeping pulses to the AF pickup device 16 and changes the electronic shutter speed and the frame rate of the AF pickup device 16 in accordance with commands from the CPU 26.

The brightness level detecting circuit 62 is a circuit serving to detect a brightness level of a subject image of each coma input from the AF pickup device 16 on the basis of the image signal output from the AF pickup device 16.

The CPU 26 reads the brightness level detected by the brightness level detecting circuit 62 and controls the electronic shutter speed and the frame rate (the number of frame images to be input per unit time) of the AF pickup device 16 by the use of the driving circuit 60 so that the brightness level is the optimum value, that is, that the brightness of the subject image is the optimum value, thereby performing the quantity of light adjustment of the subject image taken by the AF pickup device 16. The electronic shutter speed is a value obtained to correspond to the exposure time (charge accumulating time) of the AF pickup device 16 at the time of taking the subject image. The frame rate represents the number of images input per unit time from the AF pickup device 16 and is a value obtained to correspond to the image input period at the time of periodically inputting the images of the comas.

Here, with the quantity of light adjustment of the AF pickup device 16, the electronic shutter speed and the frame rate are changed, thereby enhancing the frame rate within a range in which the quantity of light is not lack. Accordingly, the detection period of the estimated focus value is shortened, thereby improving the following ability of focus at the time of performing the AF control.

Figure 4:
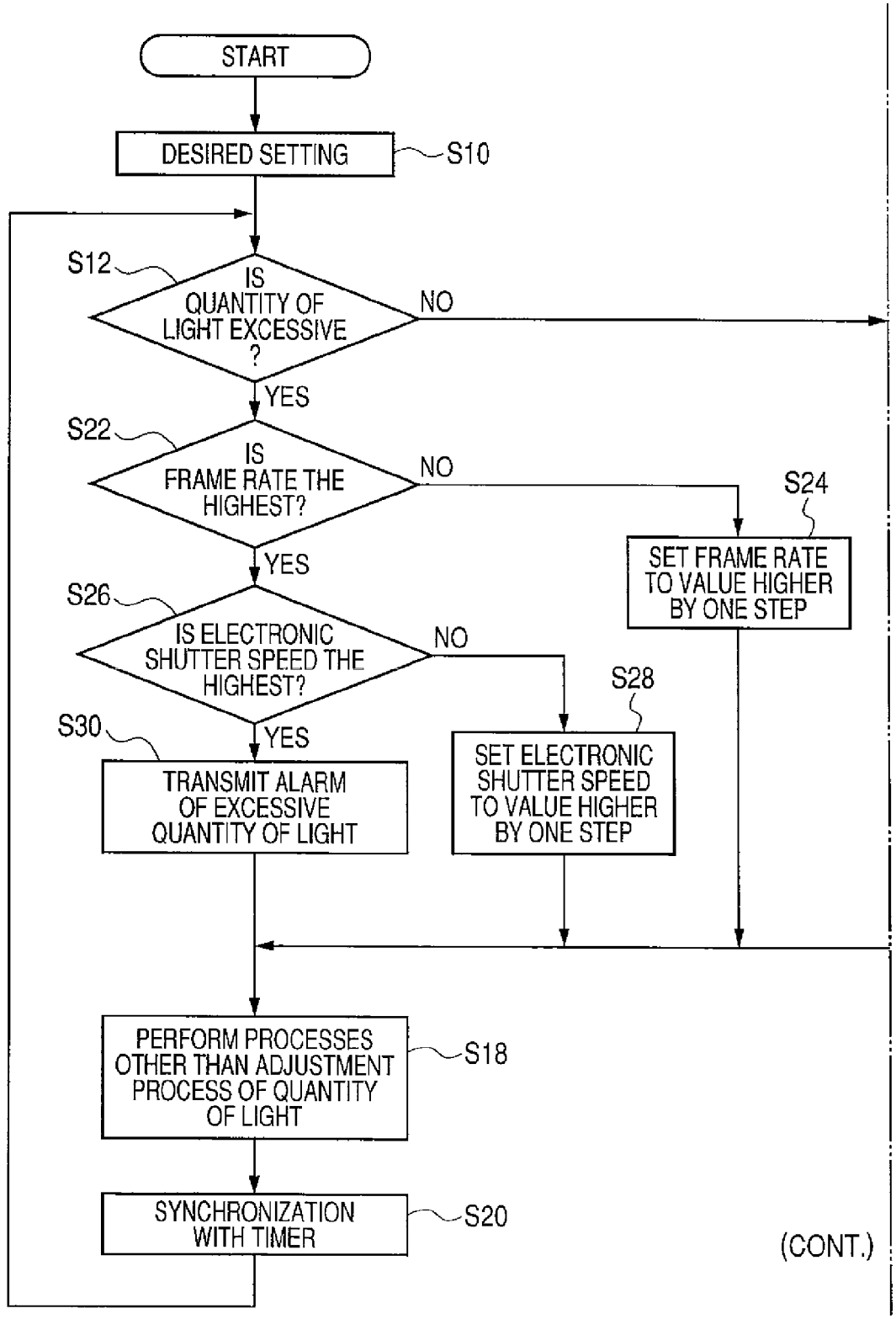
FIG. 4 is a flowchart illustrating a flow of processes of a CPU for quantity of light adjustment (exposure adjustment) of an AF pickup device.

FIG. 4 is a flowchart illustrating a flow of processes for the light intensity adjustment of the AF pickup device 16 in the CPU 26. When the AF control process is started, the CPU 26 performs a desired setting process (step S10). At this time, the frame rate and the electronic shutter speed of the AF pickup device 16 are set to predetermined initial values. In an interlace method in which one frame image is divided into two field images and then the field images are input, the field image by one field is considered as a frame image by one coma in this embodiment.

Subsequently, the CPU 26 reads the brightness level of an image signal input by the AF pickup device 16 from the brightness level detecting circuit 62 and determines whether the quantity of light is excessive (step S12). When it is determined that it is NO, the CPU 26 determines whether the quantity of light is insufficient (step S14). When it is determined that it is NO, that is, when the electronic shutter speed (exposure dose) is appropriate, the frame rate is set to the highest value at the currently set value of the electronic shutter speed (step S16).

Here, in this embodiment, the frame rate is changed to discrete and gradual values such as 15, 30, 60, . . . , 240, . . . (fps) and the electronic shutter speed is set so that, for example, the charge accumulating time is a time length such as 1, ½, and ¼ which are multiples of gradual values of the input period of the frame image at each frame rate. On the other hand, in setting the frame rate in step S16, the frame rate is set so that the input period of the frame image is not shorter than the exposure time but the smallest without changing the electronic shutter speed (exposure time). Accordingly, the frame rate is enhanced within a range in which the electronic shutter speed is not limited.

When ending the process of step S16, the CPU 26 performs processes other than the light intensity adjustment process (step S18), waits until a prescribed time passes in synchronization with a timer (step S20), and then repeatedly performs the processes of step S12 or steps subsequent thereto.

When it is determined in step S12 that it is YES, that is, that the quantity of light is excessive, the CPU 26 determines whether the current frame rate is the highest speed of settable speeds (step S22). When it is determined that it is NO, the frame rate is changed to a value higher by one step (step S24). At this time, the electronic shutter speed is changed to a high side with the change of the frame rate. For example, the magnification of the exposure time relative to the input period of the frame image (ratio of the exposure time to the input period) should not be changed. Accordingly, the exposure dose is reduced with an increase in electronic shutter speed. When the process of step S24 is ended, the processes of steps S18 and S20 are performed and then the process of step S12 is performed again.

When it is determined in step S22 that it is NO, that is, that the frame rate is the highest, it is determined whether the electronic shutter speed is the highest (step S26). When it is determined that it is NO, the electronic shutter speed is changed to a value higher by one step (step S28). Accordingly, the exposure dose is reduced. Thereafter, the processes of steps S18 and S20 are performed and then the process of step S12 is performed again.

When it is determined in step S26 that it is YES, that is, that the electronic shutter speed is the highest, the exposure dose cannot be increased from the current value. Accordingly, an alarm of the excessive quantity of light is transmitted to the camera body or the like (step S30). Thereafter, the processes of steps S18 and S20 are performed and then the process of step S12 is performed again.

When it is determined in step S14 that it is YES, that is, that the quantity of light is insufficient, the CPU 26 determines whether the electronic shutter speed is the lowest relative to the frame rate (step S32). That is, the CPU 26 determines that the exposure time is the longest time within a range not exceeding the input period of the frame image. When it is determined that it is NO, the electronic shutter speed is changed to a value lower by one step (step S34). Accordingly, the exposure dose is increased. Thereafter, the processes of steps S18 and S20 are performed and then the process of step S12 is performed again.

When it is determined in step S32 that it is YES, that is, that the electronic shutter speed is the lowest, it is determined whether the frame rate is the lowest (step S36). When it is determined that it is NO, the frame rate is changed to a value lower by one step (step S38). At this time, the electronic shutter speed is changed to a low value with the change of the frame rate. For example, the magnification of the exposure time relative to the input period of the frame image (ratio of the exposure time to the input period) should not be changed. Accordingly, the electronic shutter speed is reduced and the exposure dose is increased. When the process of step S38 is ended, the processes of steps S18 and S20 are performed and then the process of step S12 is performed again.

When it is determined in step S36 that it is NO, that is, that the frame rate is the lowest, the exposure dose cannot be increased from the current value. Accordingly, an alarm of the insufficient light intensity is transmitted to the camera body or the like (step S40). Thereafter, the processes of steps S18 and S20 are performed and then the process of step S12 is performed again.

In this way, the electronic shutter speed is properly set and the frame rate is set to a value as high as possible within a range exceeding the electronic shutter speed. The process of step S16 is not absolutely necessary. When the electronic shutter speed and the frame rate are controlled independent of each other, instead of the flow of processes shown in FIG. 4, a process of setting the frame rate so as to be the lowest within the range in which the input period of the frame image is not shorter than the exposure time may be performed after the electronic shutter speed is set to an appropriate value.

Figure 5:
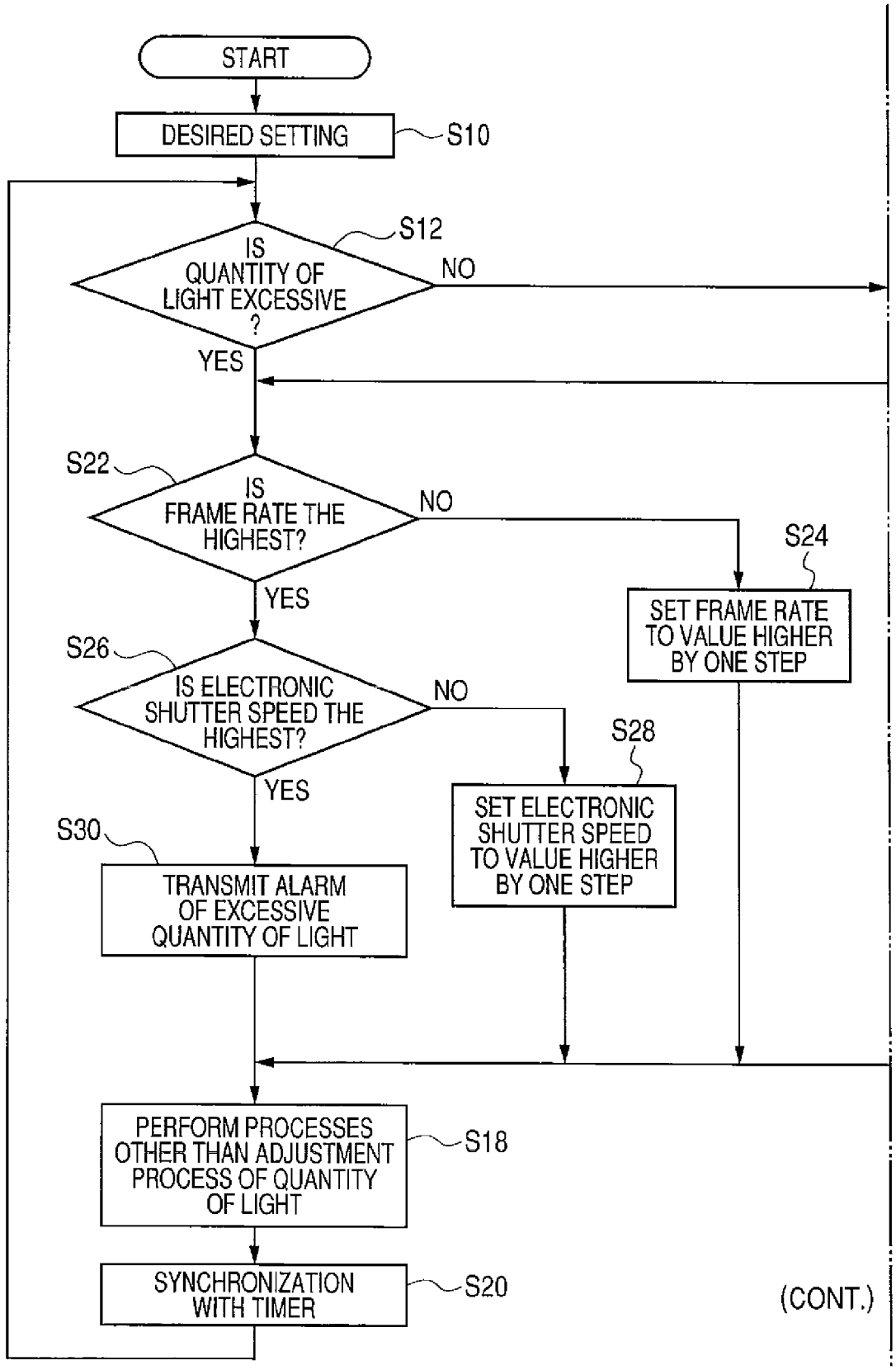
FIG. 5 is a flowchart illustrating a flow of processes of the CPU for quantity of light adjustment (exposure adjustment) of the AF pickup device according to another embodiment of the invention.

Subsequently, the flow of processes of the CPU 26 will be described when the light intensity adjustment is performed in consideration of the contrast (estimated focus value) of the subject image detected by the estimated focus value detector 40. FIG. 5 is a flowchart illustrating a flow of processes in this case. In the figure, the steps having the processing details equal or similar to those of FIG. 4 are denoted by the same reference numerals as FIG. 4 and description thereof is omitted.

In the flowchart shown in FIG. 5, when it is determined in step S12 that it is NO, the CPU 26 determines whether there is a margin in the contrast of the subject image input from the AF pickup device 16 on the basis of the estimated focus value acquired from the estimated focus value detector 40 (step S50). That is, the CPU 26 determines whether the estimated focus value is equal to or greater than a predetermined value. When it is determined that it is YES, the exposure dose can be reduced similarly to the case where it is determined in step S12 that the light intensity is excessive. Accordingly, the process of step S22 is performed. When it is determined that it is NO, the process of step S14 is performed.

The CPU 26 determines whether the light intensity is insufficient in step S14, performs the process of step S16 when it is determined that it is NO, and then determines whether the contrast of the subject image input from the AF pickup device 16 is insufficient on the basis of the estimated focus value acquired from the estimated focus value detector (step S52). When it is determined that it is YES, the process of step S18 is performed. On the contrary, when it is determined that it is NO, an alarm of insufficient contrast is transmitted to the camera body or the like (step S54). Then, the process of step S18 is performed.

Although such a type of automatic focusing system for detecting a focusing state by performing a wobbling process by the use of one AF pickup device has been described in the above-mentioned embodiment, the invention may be applied to an automatic focusing system employing an AF operation of a so-called optical length difference type. In this system, plural pickup faces (for example, two pickup faces) as the pickup faces of the AF pickup device are disposed at positions having different optical lengths. The pickup faces may be pickup faces of different AF pickup devices or an optical length difference may be provided to a pickup face of the same image pickup device. The subject image formed at a position spaced by an equivalent distance forward or backward from the pickup face of the video pickup device is taken by the pickup faces of the AF pickup device. A processor corresponding to the estimated focus value detector 40 detects the estimated focus values from the image signals (brightness signals) acquired by taking an image by the use of the pickup faces of the AF pickup device. By comparing the estimated focus values with each other, the focusing state (in-focus, front-focused, rear-focused) is detected. By controlling the focus lens of the photographing lenses on the basis of the detected focusing state, the focus of the photographing lenses is set to the in-focus state.

Although the automatic focusing system employing the contrast type AF operation of performing the AF operation on the basis of the contrast of an image acquired by the AF pickup device has been described in the above-mentioned, the invention may be applied to an automatic focusing system for taking a subject image by the use of the AF pickup device (including a line sensor or the like) as the subject information and performing an AF operation on the basis of the subject image, other than the contrast type automatic focusing system.

In the mode in which the frame rate of the AF pickup device 16 is changed as described in the above-mentioned embodiment, a mode for setting (fixing) the frame rate to a value desired by a user may be selected and the modes may be switched by predetermined selection section.

What is claimed is:

1. An automatic focusing system comprising:
    a photographing optical system that forms a subject image;
    a video pickup device that is allowed to input the subject image, which is formed by the photographing optical system, as a recording or reproducing subject image;
    an AF pickup device that is an image pickup device for sequentially inputting the subject image as subject information used in an automatic focusing operation of automatically setting a focusing state of the photographing optical system for the video pickup device to an in-focus state, the AF pickup device which is different from the video pickup device;
    an automatic focusing section that automatically adjusts the focus of the photographing optical system so that the focusing state of the photographing optical system is changed to the in-focus state based on the subject image received by the AF image pickup device;
    an exposure time adjusting section that adjusts an exposure time for allowing the AF image pickup device to take the subject image of respective comas so as to be an appropriate exposure dose; and
    an image input period changing section that changes an image input period at the time of allowing the AF pickup device to sequentially and periodically input the subject image of the respective comas within a range not shorter than the exposure time, in accordance with the exposure time adjusted by the exposure time adjusting section.

2. The automatic focusing system according to claim 1, wherein the automatic focusing section includes contrast detecting section that detects a contrast of the subject image input by the AF pickup device and automatically adjusts the focus of the photographing optical system based on the contrast of the subject image detected by the contrast detecting section so that the focusing state of the photographing optical system is changed to the in-focus state.

3. The automatic focusing system according to claim 2, wherein the exposure time adjusting section performs a process of reducing the exposure time when a value representing the magnitude of the contrast of the subject image detected by the contrast detecting section is not less than a predetermined value even if the exposure dose appropriates.

4. The automatic focusing system according to claim 1 further comprising:
    an image input period setting section that sets the image input period of the AF pickup device to a desired value;
    a selection section that selects one of the image input period setting section and the image input period changing section to set the image input period of the AF pickup device.

5. The automatic focusing system according to claim 2 further comprising:
    an image input period setting section that sets the image input period of the AF pickup device to a desired value;
    a selection section that selects one of the image input period setting section and the image input period changing section to set the image input period of the AF pickup device.

6. The automatic focusing system according to claim 3 further comprising:
    an image input period setting section that sets the image input period of the AF pickup device to a desired value;
    a selection section that selects one of the image input period setting section and the image input period changing section to set the image input period of the AF pickup device.

* * * * *